(12) United States Patent
Ito et al.

(10) Patent No.: US 10,020,470 B2
(45) Date of Patent: Jul. 10, 2018

(54) BATTERY PACK AND ELECTRIC WORK VEHICLE

(71) Applicant: Kubota Corporation, Osaka-shi (JP)

(72) Inventors: Hirokazu Ito, Sakai (JP); Kazuo Koike, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 14/956,650

(22) Filed: Dec. 2, 2015

(65) Prior Publication Data

US 2016/0293906 A1    Oct. 6, 2016

(30) Foreign Application Priority Data

Apr. 2, 2015    (JP) ................................ 2015-076062

(51) Int. Cl.
| | |
|---|---|
| *H01M 2/02* | (2006.01) |
| *B60L 11/18* | (2006.01) |
| *H01M 2/10* | (2006.01) |
| *H01M 10/625* | (2014.01) |
| *H01M 10/6563* | (2014.01) |
| *H01M 10/6557* | (2014.01) |
| *H01M 10/6566* | (2014.01) |
| *H01M 10/613* | (2014.01) |
| *A01D 34/64* | (2006.01) |
| *A01D 34/78* | (2006.01) |

(Continued)

(52) U.S. Cl.
CPC .......... *H01M 2/0242* (2013.01); *A01D 34/64* (2013.01); *A01D 34/78* (2013.01); *B60K 1/04* (2013.01); *B60L 11/1874* (2013.01); *B60L 11/1877* (2013.01); *B60L 11/1879* (2013.01); *H01M 2/1077* (2013.01); *H01M 10/613* (2015.04); *H01M 10/625* (2015.04); *H01M 10/6557* (2015.04); *H01M 10/6563* (2015.04); *H01M 10/6566* (2015.04); *B60K 2001/0416* (2013.01); *B60L 2200/40* (2013.01); *B60L 2240/545* (2013.01); *H01M 10/6551* (2015.04); *H01M 2220/20* (2013.01)

(58) Field of Classification Search
CPC ............ H01M 2/0242; H01M 10/613; H01M 10/6563; H01M 10/6566; A01D 34/64; A01D 34/78; A01D 69/02; B60L 11/1874; B60K 1/04; B60K 2001/0416; B60K 2001/005
See application file for complete search history.

(56) References Cited

U.S. PATENT DOCUMENTS 5,456,994 A    10/1995 Mita
6,411,063 B1 *  6/2002 Kouzu .................. B60L 3/0046
                                              320/150

(Continued)

FOREIGN PATENT DOCUMENTS

DE    102013219452 A1    4/2014
EP        2819235 A1    12/2014

(Continued)

*Primary Examiner* — Brian L Swenson
(74) *Attorney, Agent, or Firm* — The Webb Law Firm

(57) ABSTRACT

A battery pack (6) for an electric work vehicle includes a battery unit (6A), a casing (60) for tightly housing the battery unit (6A), a circulation fan (6B) mounted in an inner space of the casing (60), and an air guide (50) provided in the casing (60) to direct cooling air produced by the circulation fan (6B) to the battery unit (6A).

12 Claims, 9 Drawing Sheets

(51) Int. Cl.
  *B60K 1/04* (2006.01)
  *H01M 10/6551* (2014.01)

(56) References Cited

U.S. PATENT DOCUMENTS

| | | | | |
|---|---|---|---|---|
| 7,319,305 | B2* | 1/2008 | Kimoto | H01M 2/1077 |
| | | | | 320/150 |
| 8,191,343 | B1* | 6/2012 | Hauser | A01D 69/02 |
| | | | | 56/11.9 |
| 8,802,267 | B2* | 8/2014 | Fujiwara | B60K 1/04 |
| | | | | 180/68.1 |
| 8,994,300 | B2* | 3/2015 | Ohkura | B60L 3/0007 |
| | | | | 318/139 |
| 9,288,942 | B2* | 3/2016 | Moriguchi | A01D 69/02 |
| 2008/0099262 | A1* | 5/2008 | Phillips | A01D 69/02 |
| | | | | 180/68.2 |
| 2013/0330587 | A1* | 12/2013 | Takahashi | H01M 2/1077 |
| | | | | 429/99 |
| 2014/0356660 | A1 | 12/2014 | Inoue | |
| 2015/0010795 | A1 | 1/2015 | Tanigaki et al. | |
| 2015/0291019 | A1* | 10/2015 | Hatta | B60K 11/06 |
| | | | | 180/68.2 |
| 2015/0314830 | A1* | 11/2015 | Inoue | B60K 1/04 |
| | | | | 180/220 |
| 2016/0183451 | A1* | 6/2016 | Conrad | A01D 34/006 |
| | | | | 56/10.2 R |

FOREIGN PATENT DOCUMENTS

| | | |
|---|---|---|
| JP | 2010123298 A | 6/2010 |
| JP | 201475181 A | 4/2014 |

\* cited by examiner

BATTERY PACK AND ELECTRIC WORK VEHICLE

CROSS REFERENCE TO RELATED APPLICATION

This application claims priority to Japanese Patent Application No. 2015-076062 filed Apr. 2, 2015, the disclosure of which is hereby incorporated in its entirety by reference.

BACKGROUND OF THE INVENTION

Field of the Invention

The present invention relates to a battery pack for an electric work vehicle propelling and performing work operation with an electric motor, and an electric work vehicle loaded with the battery pack.

Related Art of the Invention

Electric vehicles driven by rotary power from electric motors have been widespread in the automobile filed. Such an electric vehicle is loaded with a battery as a power source for the electric motor. In many cases, the battery includes a cooling system for keeping the battery temperature at a proper level to maintain the performance of the battery. An example of conventional battery packs for vehicles is disclosed in Japanese Unexamined Patent Application Publication No. 2014-075181 (JP 2014-075181 A), which corresponds to German Patent Application No. DE 10 2013 219 452 A1. The battery pack includes a casing, a plurality of battery cells housed in the casing, and a cooling fan housed in the casing for directing air to the battery cells. The casing includes an inlet for introducing air from the outside into the casing, and an outlet for discharging air to the outside of the casing. An air flow generated by rotation of the cooling fan passes through gaps defined between the battery cells, and through an intake passage extending in a bottom space defined between an inner bottom surface of the casing and a bottom surface of the battery cells. More particularly, the cooling air introduced from the outside into the casing via the inlet passes through the intake passage, the bottom space, and the gaps between the battery cells to be discharged to the outside from the outlet. The battery pack further includes a plurality of radiator fins projecting downward from the bottom surface of the casing.

On the other hand, work vehicles such as a lawn mower, a rice transplanter and a tractor, have to travel and perform work operation at a same time in ambience poorer than ambience for automobiles. Thus, cooling air, which are introduced from the ambience, easily entrains glass clippings or straws. As a result, a cooling air passage is easily choked up with such foreign matters.

SUMMARY OF THE INVENTION

Under the circumstances, a demand has been growing for a system for effectively cooling a battery mounted on an electric work vehicle that travels during work operation in an environment with airborne clippings or straws, to maintain the battery temperature within a proper level range.

A battery pack for an electric work vehicle according to the present invention includes a battery unit, a casing for tightly housing the battery unit, a circulation fan mounted in an inner space of the casing, and an air guide provided in the casing to direct cooling air produced by the circulation fan to the battery unit.

With the above arrangement, the battery unit and the circulation fan are housed tightly in a single casing. This prevents entry of foreign matters from the outside by air circulation within the casing caused by the circulation fan, and by restriction against entry of ambient air by tight closing of the casing; and yet maintains uniform temperature within the casing. The air guide is provided to achieve the uniform temperature within the casing more effectively. The air guide functions to properly orient the cooling air generated by the circulation fan to provide uniform temperature distribution over the battery unit. Such a uniform temperature distribution over the battery unit results in efficient use of the battery modules.

It should be noted that the term "tightly housing" should not be construed in a narrow meaning that the casing is maintained in a perfect airtight condition, but should be construed in a broader meaning that the casing may be closed less tightly to the extent that the amount of ambient air introduced into the casing is sufficiently reduced to prevent the ambient temperature from being easily equilibrated with the inner space temperature.

It should be noted that the present invention is also intended to cover an electric work vehicle equipped with the above battery pack. More particularly, the electric work vehicle according to the present invention includes a battery pack, rear wheels driven by power supply from the battery pack, and an work implement disposed forward of a central axis of the rear wheels and driven by power supply from the battery pack, in which the battery pack is disposed rearward from the central axis of the rear wheels. Further, the battery pack includes a battery unit, a casing for tightly housing the battery unit, a circulation fan mounted in an inner space of the casing, and an air guide provided in the casing to direct cooling air produced by the circulation fan to the battery unit. Thus, such an electric work vehicle can enjoy all the advantages brought by the above-described battery pack.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, and the description taken with the drawings making apparent to those skilled in the art how the forms of the present invention may be embodied in practice.

Prior to detailed description of a battery pack and an electric work vehicle loaded with the battery pack according to one specific embodiment of the present invention, a fundamental arrangement of the battery pack will be described first with reference to FIG. 1.

Figure 1:
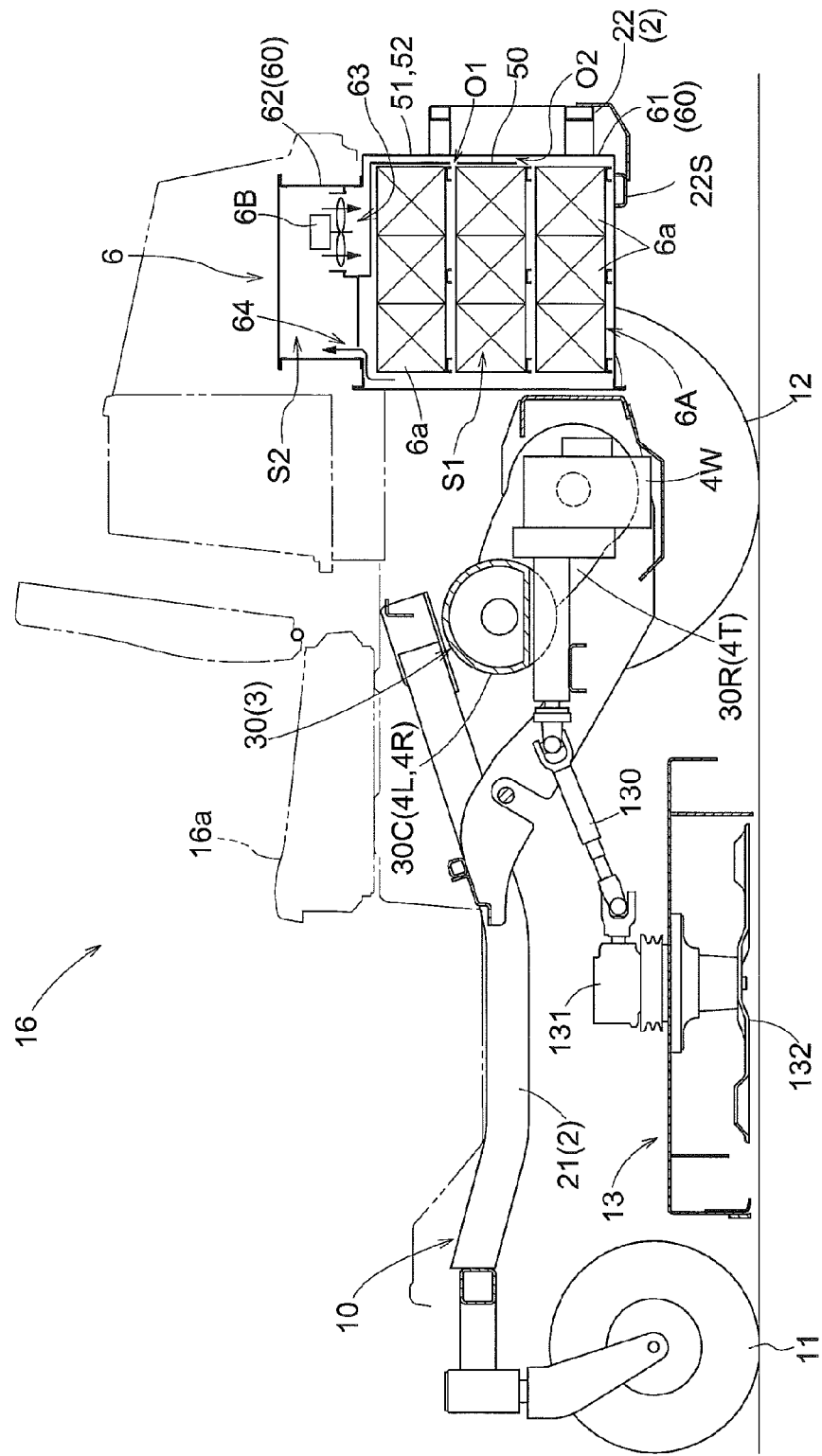
FIG. 1 is an explanatory view showing a fundamental arrangement of a battery pack mounted on an electric work vehicle.

While shown as disassembled in FIG. 1, the battery pack 6 is rectangular in basic configuration and mounted on a vehicle body 10 supported on the ground via front wheels 11 and rear wheels 12. In the embodiment as shown in FIG. 1, the rear wheels 12 are driving wheels driven by electric power supplied from the battery pack 6.

While a work implement 13 is arranged forward of the rear wheels 12 in a fore-and-aft direction, i.e., the running direction of the vehicle, the battery pack 6 is arranged rearward of the rear wheels 12 in the fore-and-aft direction. Such an arrangement provides preferable fore/aft weight balance of the vehicle.

The battery pack 6 includes a casing 60. The casing 60 accommodates a battery unit 6A and a circulation fan 6B. The casing 60 mainly consists of a rectangular first casing 61 for housing the battery unit 6A, and a rectangular second casing 62 projecting from a top surface of the first casing 61 like a chimney. The second casing 62 is smaller than the first casing 61 in size. The first casing 61 has a first inner space S1 for accommodating the battery unit 6A, and the second casing 62 has a second inner space S2 for accommodating the circulation fan 6B. In this arrangement, a battery retainer framework 51 provides a build of the casing 60. The battery unit 6A includes a plurality of battery modules 6a, three by three, i.e., nine modules all told, in the example shown in FIG. 1, and is supported by the battery retainer framework 51. External surfaces of the battery retainer framework 51 are covered with panels 52 to produce the closed first inner space S1.

The first inner space S1 is similar to the battery unit 6A in configuration, but somewhat larger than the battery unit 6A. For example, a narrow gap in the order of several millimeters to several centimeters is formed between the inner surface of the first casing 61 and the outer surface of the battery unit 6A. A fan opening 63 and a return opening 64 are formed in a boundary between the first casing 61 and the second casing 62. While the first inner space S1 communicates with the second inner space S2 via the fan opening 63 and the return opening 64, both the first inner space S1 and the second inner space S2 are tightly closed to the outside to the extent to prevent entry of ambient air, glass clippings or pieces of paper. The circulation fan 6B is arranged to allow cooling air produced by the circulation fan 6B to flow into the first inner space S1 via the fan opening 63.

A plate-shaped air guide 50 extends along a top surface of the battery unit 6A under the fan opening 63 to prevent cooling air entered the first inner space S1 from directly colliding with the top surface of the battery unit 6A. The air guide 50 further extends downward along a vertical side surface of the battery unit 6A to guide the cooling air downward. Slits O1 are formed at intermediate positions of the air guide 50 in its downward extending direction, and an opening O2 is defined at a lower end of the air guide 50. The cooling air is directed to the battery unit 6A through each slit O1 and the lower-end opening O2. In the embodiment as shown in FIG. 1, the slit O1 is positioned to agree with a gap defined between the top tier of battery modules 6a and the middle tier of battery modules 6a, and the lower-end opening O2 is positioned slightly above a gap defined between the middle tier of battery modules 6a and the bottom tier of battery modules 6a.

The return opening 64 allowing the first inner space S1 is disposed opposite from the fan opening 63 to be communicated with the second inner space S2. The direct communication between the return opening 64 and the fan opening 63 is restricted by the air guide 50. More particularly, the air guide 50 functions as a partition for at least partially dividing a cooling air space including the fan opening 63 for the circulation fan 6B from a cooling air space including the battery unit 6A. With such an arrangement, the cooling air produced by the circulation fan 6B is guided downward by the air guide 50 from the fan opening 63 to pass through the battery unit 6A and enter the second inner space S2 via the return opening 64, and then returns to a drawing side of the circulation fan 6B. A heat sink may be preferably provided on an external surface of the casing 60 to cool an inner space of the casing 60 (i.e. an inner space of the first casing 61 and an inner space of the second casing 62) to prevent increase in temperature in the cooling air space. More particularly, the heat sink may be preferably disposed on at least part of external surfaces of the panels 52 forming the external surfaces of the first casing 61 and the second casing 62. The shapes of the air guide 50 and the slit O1 formed in the air guide 50 are determined experientially or experimentally such that the plurality of battery modules 6a are uniformly cooled. The slit O1 may be a louver. Further, an adjusting plate may be preferably provided to vary an opening area of the slit O1 or the lower-end opening O2 to secure uniform temperature for each of the battery modules 6a with higher accuracy.

Figure 2:
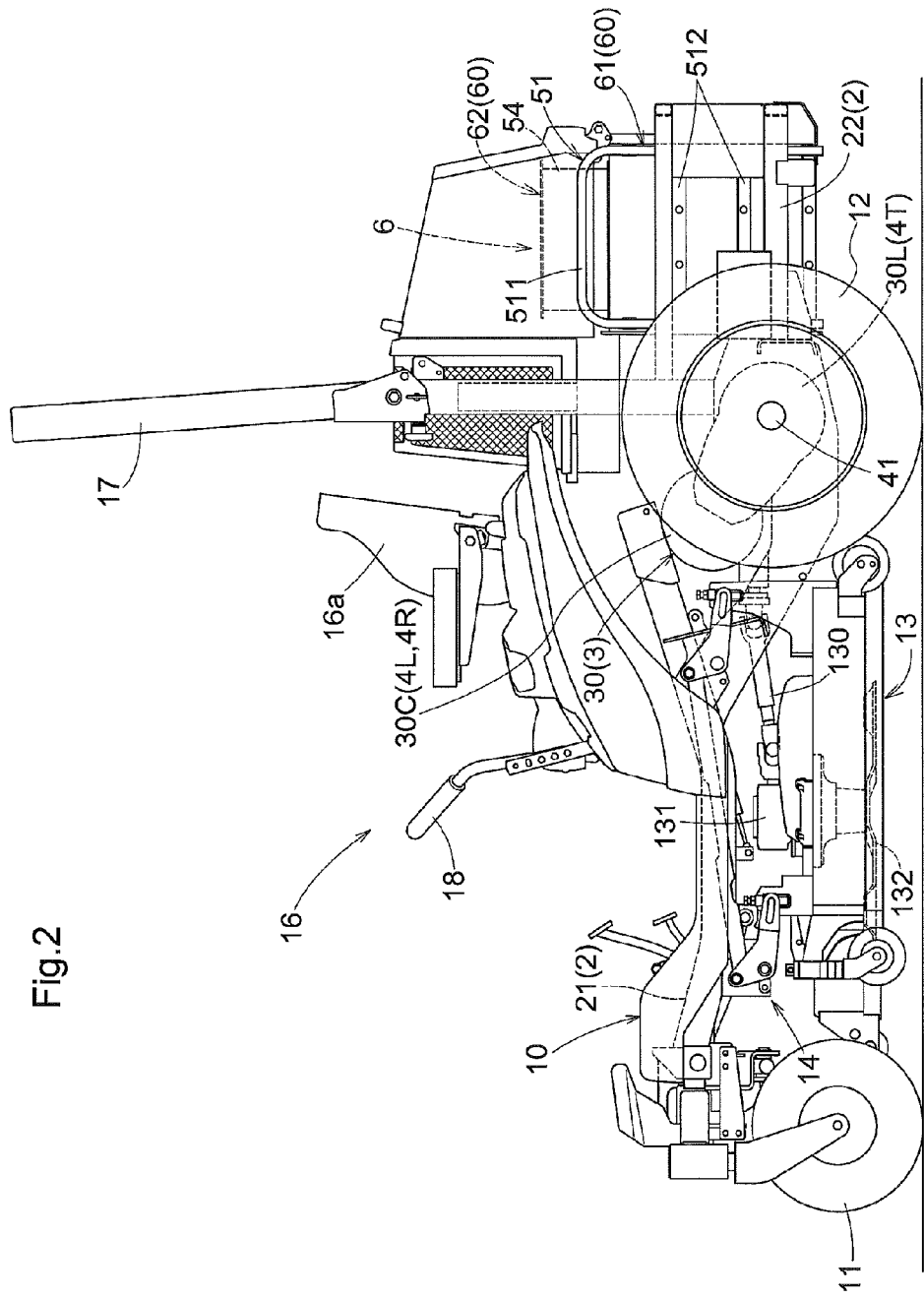
FIG. 2 is a side view of an electric lawn mower.
Figure 3:
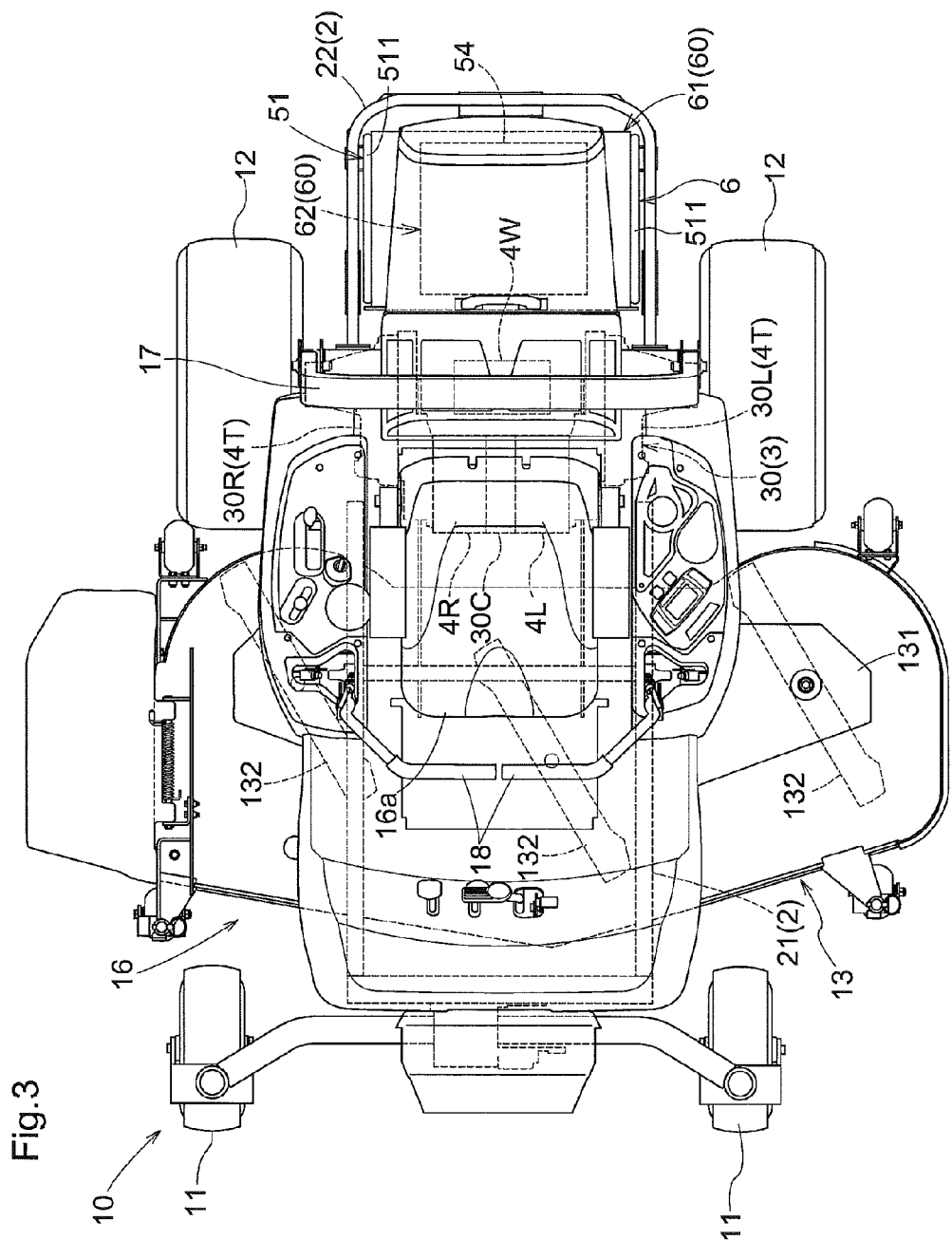
FIG. 3 is a top plan view of the electric lawn mower.
Figure 4:
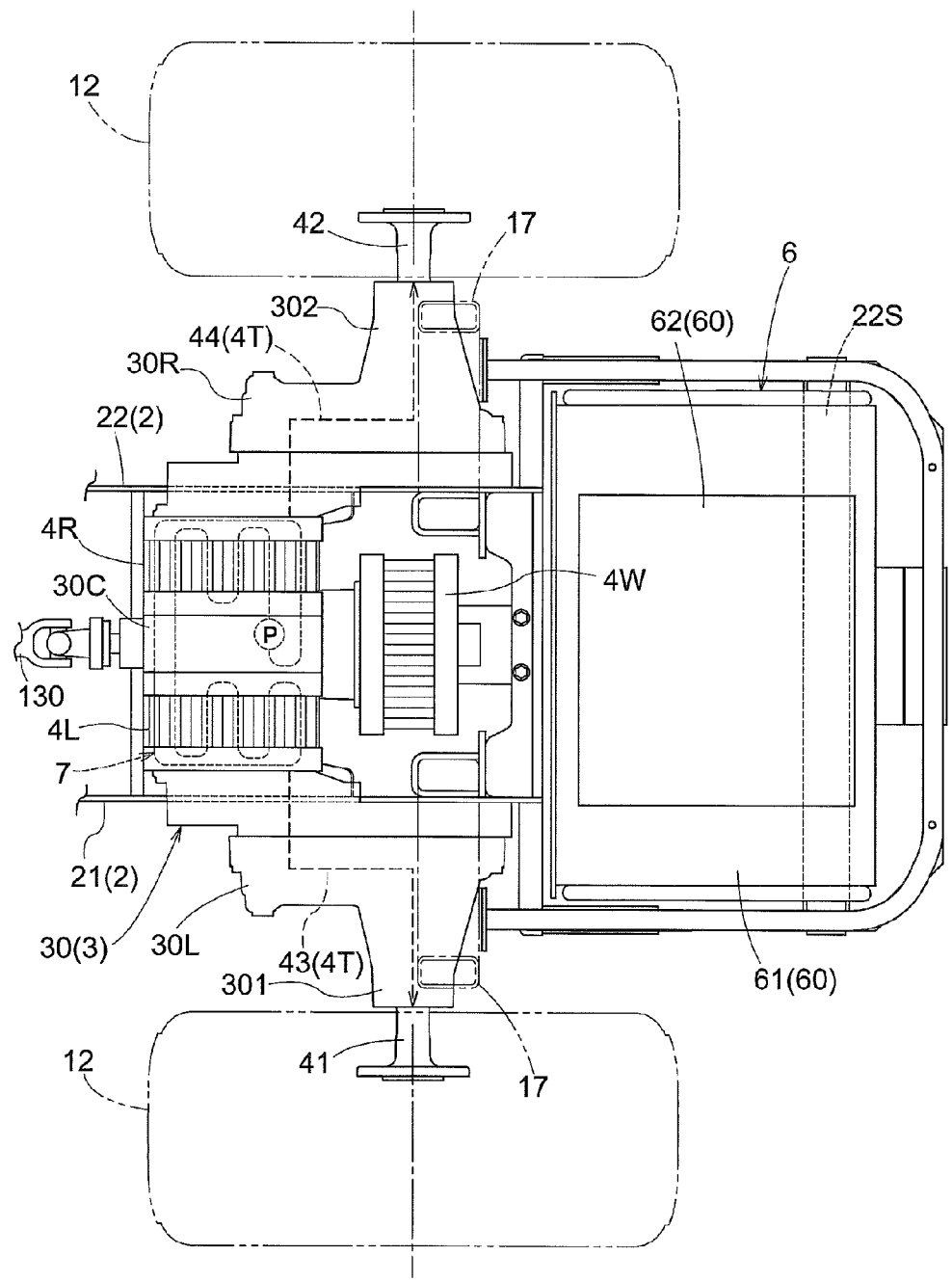
FIG. 4 is a top plan view of the battery pack and motors powered by the battery pack.

Next, an electric work vehicle loaded with a battery pack according to a specific embodiment will be described with reference to FIGS. 2 to 4. FIG. 2 is a side view of an electric lawn mower, which is an example of the electric work vehicle, FIG. 3 is a top plan view of the electric lawn mower, and FIG. 4 is a top plan view of a rear part of the electric lawn mower. With reference to FIGS. 2 to 4, the electric lawn mower (simply referred to as "lawn mower" also hereinafter) includes a vehicle body 10 supported on the ground by a pair of right and left front wheels 11 and a pair of right and left rear wheels 12 acting as driving wheels. The vehicle body 10 has a vehicle frame 2 acting as a base frame and mainly consisting of a pair of right and left front frames 21 and a rear frame 22. A mower unit 13 is suspended from the front frames 21 between the front wheels 11 and the rear wheels 12 via a link mechanism 14. The mower unit 13 includes a blade transmission mechanism 131 and blades 132 propelled by the blade transmission mechanism 131. An operator's section 16 is provided in a central region of the vehicle body 10 in the fore-and-aft direction of the vehicle. With this arrangement, a driver's seat 16a is inevitably mounted on the central region of the vehicle body 10 in the fore-and-aft direction via a seat support.

With reference to FIG. 4, a driving unit 3 is disposed between the right and left front frames 21 at a rear end region of the front frames 21. The driving unit 3 includes a casing structure 30. The casing structure 30 is gate shaped as viewed from the top; and includes a left casing 30L forming a left portion thereof, a right casing 30R forming a right portion thereof, and a central casing 30C connecting the left casing 30L to the right casing 30R. The left casing 30L and the right casing 30R extend rearward from the central casing 30C. A left rear-axle casing is formed at an end region of the left casing 30L for supporting a left rear axle 41, and a right rear-axle casing is formed at an end region of the right casing 30R for supporting a right rear axle 42. The casing structure 30 is connected to the right and left front frames 21 to act as a cross beam of the vehicle frame 2. The rear frame 22 extends further from the casing structure 30 and the front frames 21 to define a receiving surface 22S on which the battery pack 6 is placed.

The central casing 30C functions as a common housing shared by a left motor 4L for driving the left rear wheel 12 and a right motor 4R for driving the right rear wheel 12. A transmission 4T includes a left transmission mechanism 43 for transmitting power from the left motor 4L to the left rear axle 41, and a right transmission mechanism 44 for transmitting power from the right motor 4R to the right rear axle 42. The left transmission mechanism 43 is housed in the left casing 30L and the right transmission mechanism 44 is housed in the right casing 30R. The transmission that is only schematically shown in arrowed broken line in FIG. 4 typically includes gear pairs, chains or transmission shafts.

The left motor 4L and the right motor 4R are independently and variably controlled. With such behavior, both the right and left rear wheels 12 are driven forward at substantially the same speed to produce straight forward speed, and both the right and left rear wheels 12 are driven reversely at substantially the same speed to produce straight reverse speed. Further, the right and left rear wheels 12 may be driven at different speeds to turn the vehicle body 10 in a desired direction. For example, while either one of the right and left rear wheels 12 is driven at low speed approximate to zero, the other of the right and left rear wheels 12 is driven forward or reversely at high speed to turn the vehicle with a short turning radius. Further, the right and left rear wheels 12 may be driven in opposite directions to allow the vehicle body 10 to spin-turn the vehicle around a center between the right and left wheels 12. The pair of right and left front wheels 11 are caster wheels that are freely rotatable about vertical axes, which change their positions in response to a running direction of the vehicle body driven by the rear wheels 12.

With reference to FIGS. 2 and 3, a pair of right and left shift levers 18 are provided on opposite sides of the driver's seat 16a to allow shifting operations for the left motor 4L and the right motor 4R. The continuously variable transmission is at a neutral stop position with the shift levers 18 being maintained at a longitudinal central position. A forward speed is produced with the shift levers 18 being operated forward from the neutral position, and a reverse speed is produced with the shift levers 18 being operated rearward from the neutral position.

A roll-over protection structure (ROPS) 17 is provided rearward of the operator's section 16. The ROPS 17 has an arched shape or inversed U-shape with its opposite free ends being connected to the rear frame 22, and the left casing 30L or the right casing 30R.

With reference to FIG. 4, an implement motor 4W is mounted in a space defined by the central casing 30C, the left casing 30L and the right casing 30R for supplying power to the mower unit 13 acting as a work implement. The implement motor 4W has an output shaft extending forward in the fore-and-aft direction of the vehicle to transmit power to the blade transmission mechanism 131 of the mower unit 13 via a relay shaft 130.

With reference to FIGS. 5 to 9, the battery pack 6 according to one embodiment of the present invention will be described hereinafter. The battery pack 6 substantially has the fundamental arrangement as described above with reference to FIG. 1. The battery pack 6 includes a battery unit 6A consisting of a plurality of battery modules 6a, three by three, i.e., nine modules all told; and is supported and assembled by a battery retainer framework 51. The battery modules 6a include lithium-ion battery cells, which are charged and powered by a battery control unit 6C.

Figure 6:
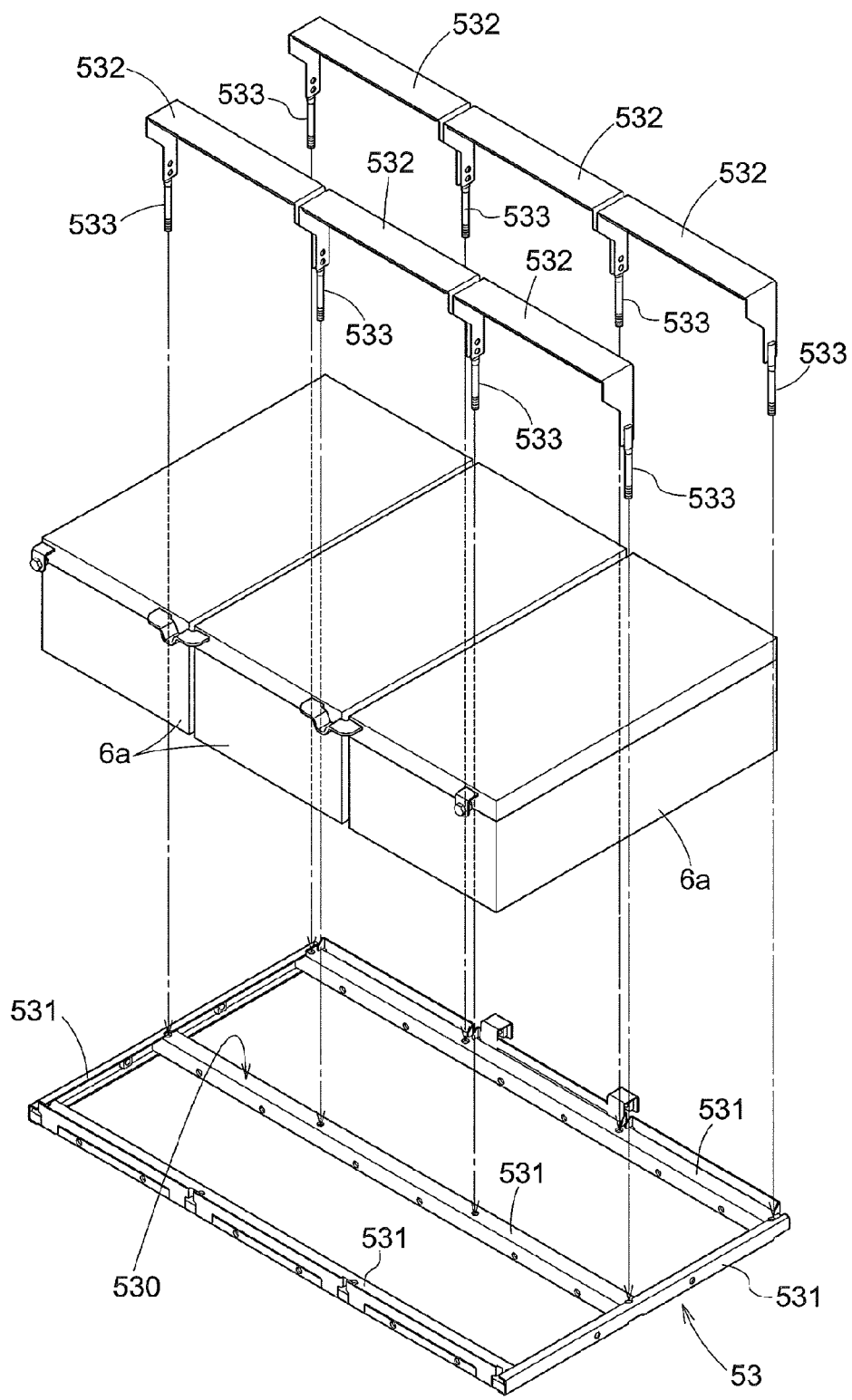
FIG. 6 is a perspective view of three horizontally-arranged battery modules assembled with a pack assembly framework.

With reference to FIG. 6, the three battery modules 6a in each tier are integrated by a pack assembly framework 53. The pack assembly framework 53 includes a base element 531 defining a battery receiving surface 530 for receiving the three horizontally-arranged battery modules 6a, and a retainer plate 532 for fastening and fixing, to the base element 531, each of the battery modules 6a placed on the base element 531. The retainer plate 532 is an inversed U-shaped bent piece made of a thin steel sheet, and has fastening bolts 533 fixed at opposite lower ends thereof to extend downward. The base element 531 consists of low-ridge-shaped pipes. Each of the pipes has through holes to correspond to the profile of each of the battery modules 6a. Nuts are fixed at a back surface of the base element 531 (within a groove of each pipe) coaxially with the through bores. The fastening bolts 533 are screwed to the nuts to fix each battery module 6a to the base element 531. Such an arrangement contributes to a low configuration of the battery modules 6a including the pack assembly framework 53. Threaded holes may be provided in the base element 531 instead of the nuts.

Figure 7:
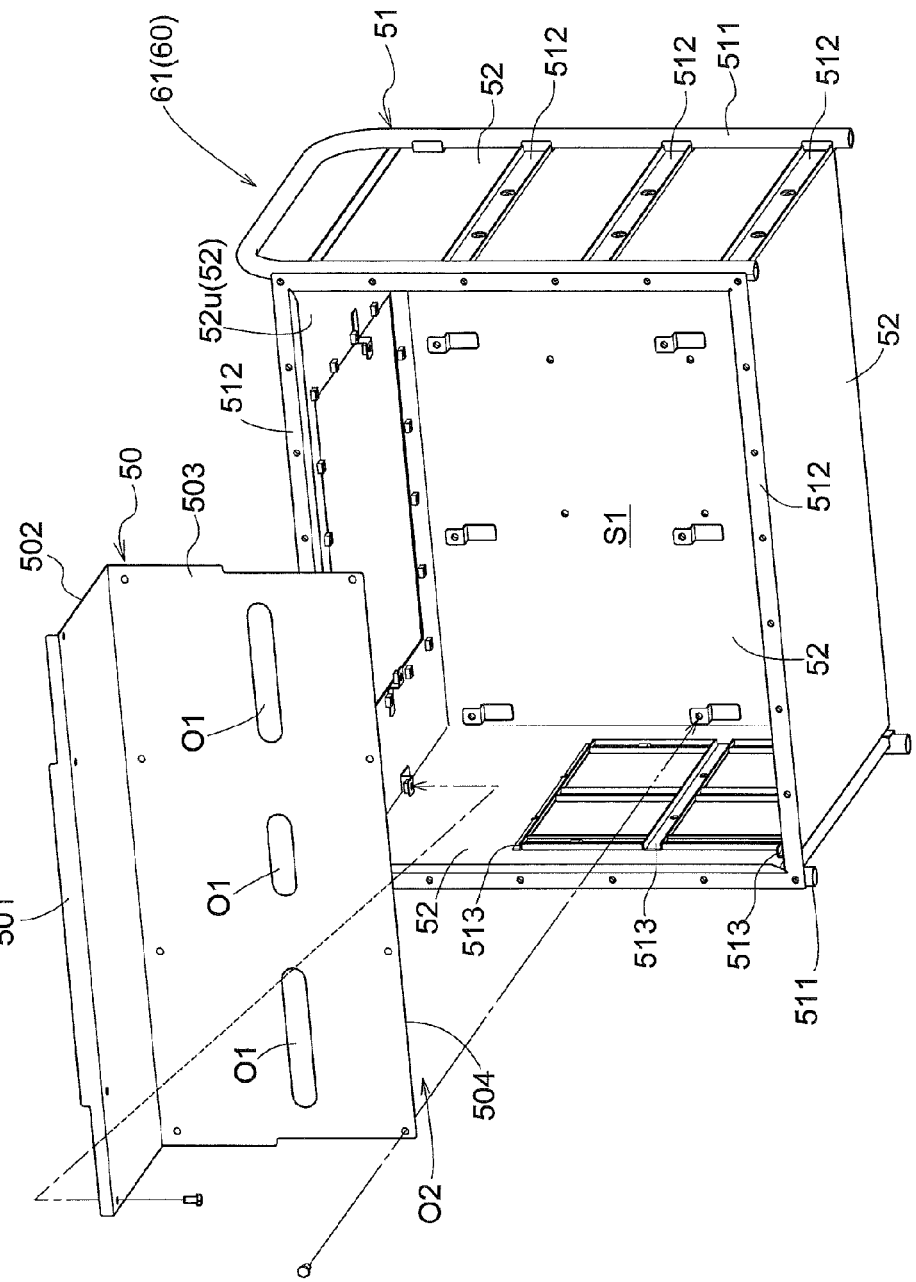
FIG. 7 is a perspective view of a battery retainer framework and an air guide.

With reference to FIG. 7, the battery retainer framework 51 has a chest-like structure with right and left inversed U-shaped side frames 511 and connecting elements 512 for connecting the side frames to each other. The side frame 511 includes a rail 513 insertibly and removably supporting the pack assembly framework 53 like a drawer. This arrangement allows the pack assembly framework 53 including the three horizontally-arranged battery modules 6a in each tier to be independently inserted into or removed from the battery retainer framework 51.

The battery retainer framework 51 has external surfaces covered with panels 52 to define the closed first inner space S1 that prevents entry of glass clippings or foreign matters.

Figure 5:
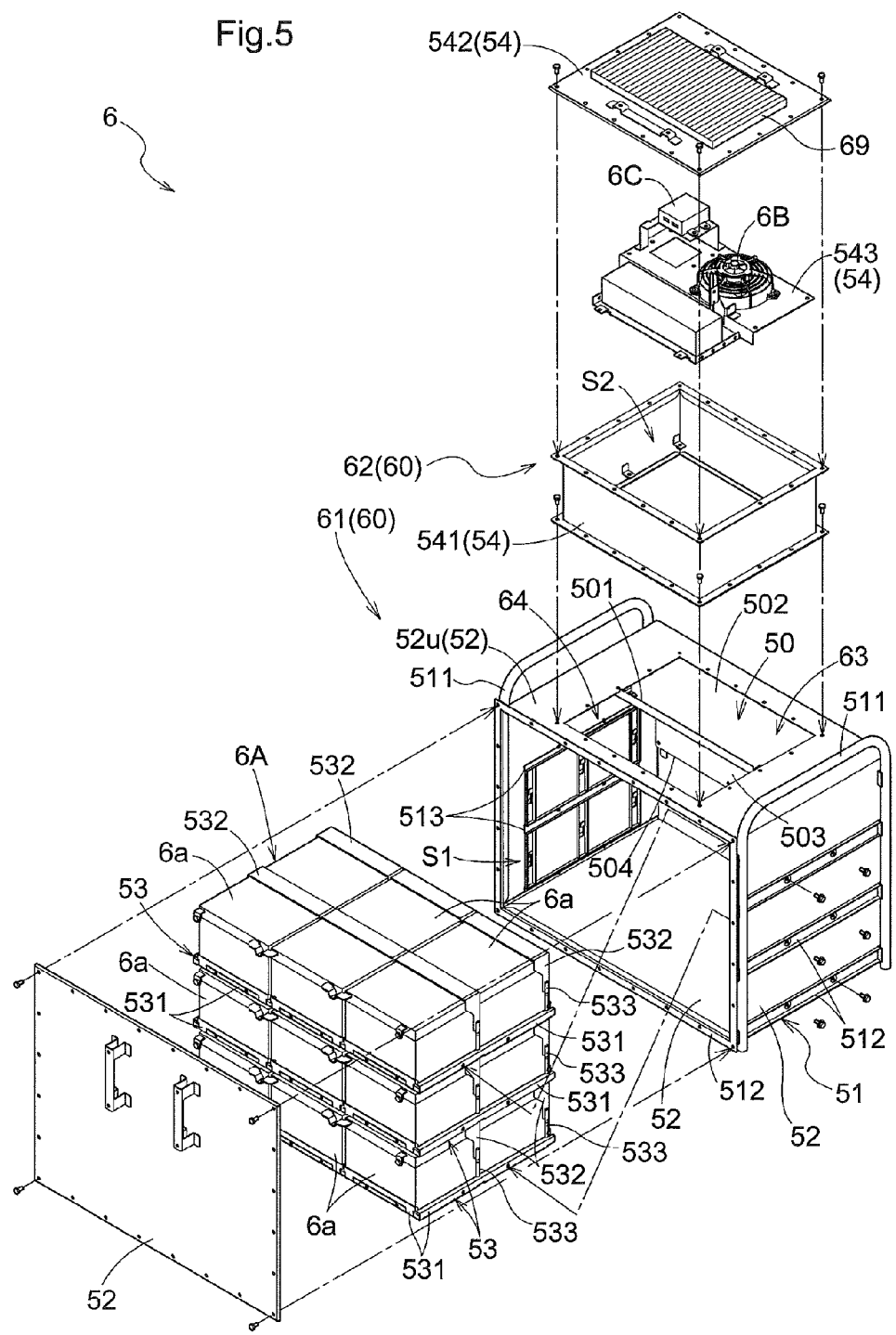
FIG. 5 is an exploded perspective view of the battery pack according to one preferred embodiment.

With reference to FIG. 5, the battery retainer framework 51 further includes an upper frame structure 54 arranged on a panel 52u forming a top surface of the battery retainer framework 51. The upper frame structure 54 is covered with four side walls 541 and a top plate 542 to define the closed second inner space S2 that prevents entry of glass clippings or foreign matters. The panel 52u, acting as a partition between the battery retainer framework 51 and the upper frame structure 54, has an opening that is somewhat smaller than a bottom surface of the upper frame structure 54 to allow communication between the first inner space S1 and the second inner space S2.

The upper frame structure 54 includes a receiving plate 543 substantially acting as a bottom plate. The battery control unit 6C and the circulation fan 6B are placed on the receiving plate 543. The circulation fan 6B is an axial flow fan with its blow-off side being oriented to the fan opening 63 on the receiving plate 543 to draw air from the above and blow it off downward as cooling air. The cooling air from the circulation fan 6B passes through the fan opening 63 to the first inner space S1.

Figure 8:
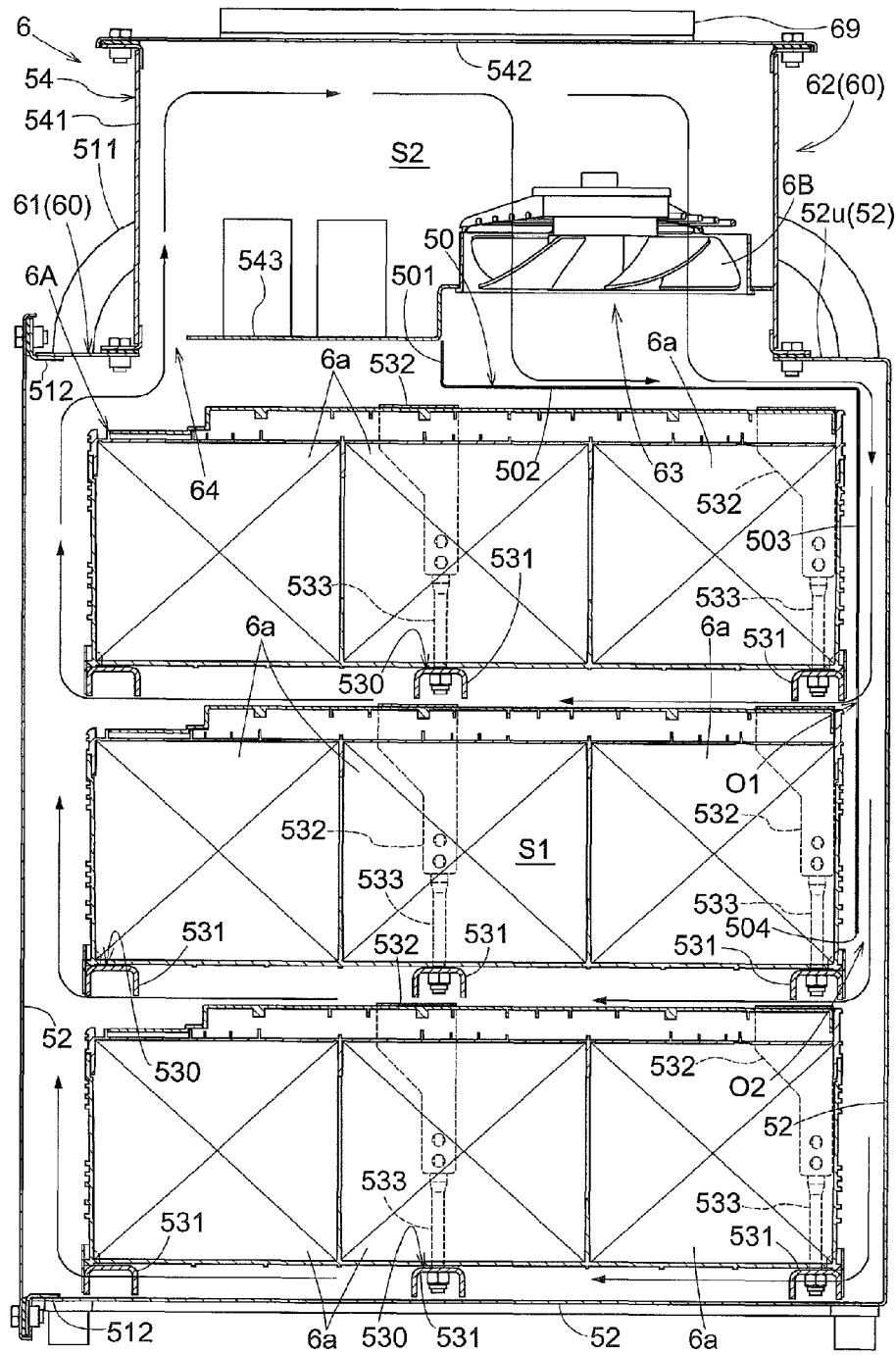
FIG. 8 is a view in vertical section in a fore-and-aft direction of the vehicle, showing the inside of the battery pack.

With reference to FIG. 8, the return opening 64 is formed in the receiving plate 543 as a through hole, in addition to the fan opening 63, around the battery control unit 6C. The cooling air directed to the first inner space S1 returns to the second inner space S2 through the return opening 64.

Figure 9:
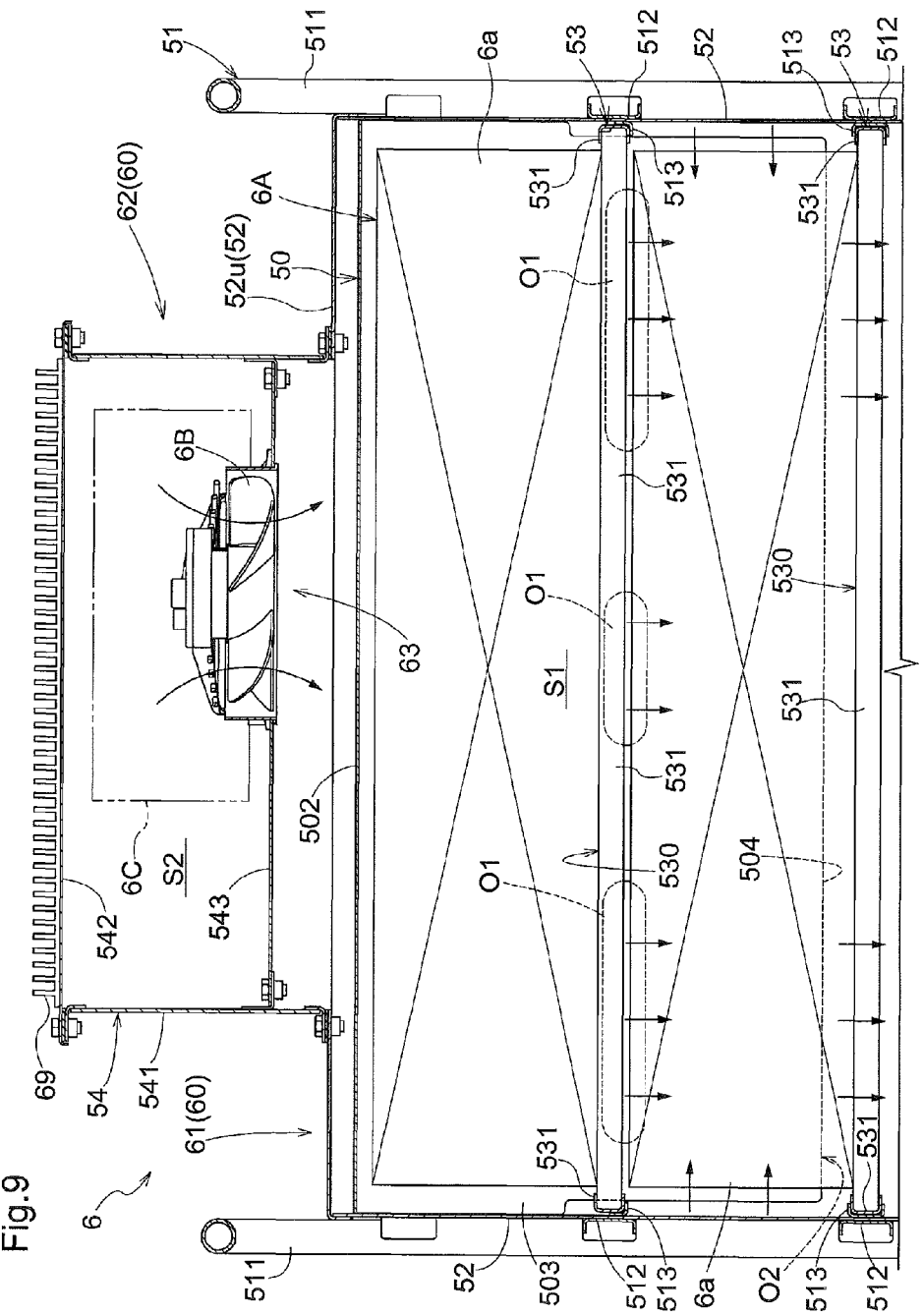
FIG. 9 is a view in vertical section in a transverse direction of the vehicle, showing the inside of the battery pack.

With reference to FIGS. 7 to 9, an air guide 50 is provided for guiding the cooling air blowing off from the fan opening 63 into a space between the side wall 541 of the battery unit 6A and the panel 52 covering the side surface of the battery retainer framework 51. The air guide 50 is a bent piece made of sheet material including a rise 501 connected to the receiving plate 543, a horizontal plate 502 extending parallel with the opening plane of the fan opening 63 above the battery unit 6A, and a vertical plate 503 extending vertically along a side of the battery unit 6A. The battery unit 6A includes three sets of three-row battery modules 6a placed on one after another in three tiers. Slits O1 are formed in the vertical plate 503 to agree with a gap defined between the top tier of battery modules 6a and the middle tier of battery modules 6a. The vertical plate 503 has a lower end 504 extending to a position slightly above a gap defined between the middle tier of battery modules 6a and the bottom tier of battery modules 6a. This arrangement produces a lower-end opening O2 between the lower end 504 and the panel 52. The slit O1 may be a louver instead of a simple opening. In this case, a sloped plate of the louver may be either fixed or variable. Although not shown, a conventional adjustable sliding window unit may be provided at the slit O1 or the lower-end opening O2 depending on necessity.

As shown in FIG. 7, with the aid of the air guide 50, the cooling air from the circulation fan 6B flows along the side surface of the battery retainer framework 51, and enters the gaps defined between the three-tiered battery modules 6a via the slit O1 and the lower-end opening O2 to cool the battery modules 6a. The cooling air further passes through the gap defined between the panel 52 and the side surface of the battery unit 6A and enters the second inner space S2 via the return opening 64. Further, the cooling air having entered the second inner space S2 is drawn by the circulation fan 6B to flow toward a drawing side of the circulation fan 6B and cool components of the battery control unit 6C. As shown in FIGS. 8 and 9, a heat sink 69 is provided on a panel forming the external surfaces of the upper frame structure 54 (the top plate 542, in particular) to cool the cooling air fed from and returned to the circulation fan 6B. The heat sink 69 may be provided on any one of the side walls 541 of the upper frame structure 54 instead of the top plate 542, or on any other panel, e.g., any one of the panels 52 forming the external surfaces of the battery retainer framework 51.

Although not shown, a cable connector is provided in the side wall 541 of the upper frame structure 54 to establish connection of a power line or a control line between the inside and the outside of the upper frame structure 54.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as those within the scope of the appended claims.

For example, alternative but non-limitative embodiments as under should fall within the scope of the invention.

Alternative Embodiments

1. In the above embodiment, the battery unit 6A includes nine battery modules 6a that are arranged in three rows and three tiers. The number of battery modules 6a is not limited to nine. Further, the battery modules 6a may be arranged in any number of rows or tiers. In any case, it is preferable to fix the battery modules 6a to the base element 531 with the band-shaped retainer plate 532, which advantageously provides a compact assembly of the battery modules 6a.

2. In the above embodiment, the battery control unit 6C is housed in the casing 60 to be cooled by the cooling air from the circulation fan 6B. Instead, the battery control unit 6C may be provided outside the casing 60. Also, a further device may be provided within the casing 60.

3. In the above embodiment, the lawn mower is described as an example of the electric work vehicle loaded with the battery pack 6. Instead, the electric work vehicle may be agricultural work vehicles such as a rice transplanter, a combine harvester or a tractor, or construction machines such as a backhoe or a bucket loader.

The present invention is not limited to the above described embodiments, and various variations and modifications may be possible without departing from the scope of the present invention.

The present invention is applicable to a battery pack for cooling a battery unit by circulating cooling air from a circulation fan, and an electric work vehicle loaded with such a battery pack.

What is claimed is:

1. A battery pack for an electric work vehicle, the battery pack comprising:
  a battery unit;
  a casing for tightly housing the battery unit such that an amount of ambient air introduced into the casing is sufficiently reduced to prevent an ambient temperature from being easily equilibrated with an inner space temperature;
  a circulation fan mounted in an inner space of the casing; and
  an air guide provided in the casing to direct cooling air produced by the circulation fan to the battery unit,
  wherein the casing includes a first casing having a first inner space for housing the battery unit, and a second casing having a second inner space for housing the circulation fan and a battery control unit connected to the battery unit, the first inner space physically separated from the second inner space.

2. The battery pack according to claim 1, wherein
  the casing includes a battery retainer framework for holding the battery unit, and a panel covering the battery retainer framework.

3. The battery pack according to claim 1, wherein
  the battery unit includes a plurality of battery modules vertically arranged in the inner space of the casing, and
  wherein the air guide is a partition extending from a fan opening of the circulation fan to a gap defined between the vertically-arranged battery modules to introduce the cooling air into the gap and dividing the fan opening from an intake of the circulation fan.

4. The battery pack according to claim 1, wherein
the battery unit includes a plurality of battery modules vertically arranged in the inner space of the casing, and
wherein the air guide is formed as a partition dividing a battery space including a plurality of battery modules from a cooling air space including a fan opening of the circulation fan, the partition having a slit to allow the battery space to communicate with the cooling air space.

5. The battery pack according to claim 4, wherein
the slit has a shape determined to allow the plurality of battery modules to be cooled uniformly.

6. The battery pack according to claim 1, further comprising a heat sink provided in an external surface of the casing.

7. An electric work vehicle comprising:
rear wheels;
an work implement; and
a battery pack arranged forward of a central axis of the rear wheels and supplying electric power for driving the rear wheels and the work implement, the battery pack including:
a battery unit;
a casing for tightly housing the battery unit such that an amount of ambient air introduced into the casing is sufficiently reduced to prevent an ambient temperature from being easily equilibrated with an inner space temperature;
a circulation fan mounted in an inner space of the casing; and
an air guide provided in the casing to direct cooling air produced by the circulation fan to the battery unit,
wherein the casing includes a first casing having a first inner space for housing the battery unit, and a second casing having a second inner space for housing the circulation fan and a battery control unit connected to the battery unit, the first inner space physically separated from the second inner space.

8. The electric work vehicle according to claim 7, wherein
the casing includes a battery retainer framework for holding the battery unit, and a panel covering the battery retainer framework.

9. The electric work vehicle according to claim 7, wherein
the battery unit includes a plurality of battery modules vertically arranged in the inner space of the casing, and
wherein the air guide is a partition extending from a fan opening of the circulation fan to a gap defined between the vertically-arranged battery modules to introduce the cooling air into the gap and dividing the fan opening from an intake of the circulation fan.

10. The electric work vehicle according to claim 7, wherein
the battery unit includes a plurality of battery modules vertically arranged in the inner space of the casing, and
wherein the air guide is formed as a partition dividing a battery space including a plurality of battery modules from a cooling air space including a fan opening of the circulation fan, the partition having a slit to allow the battery space to communicate with the cooling air space.

11. The electric work vehicle according to claim 10, wherein the slit has a shape determined to allow the plurality of battery modules to be cooled uniformly.

12. The electric work vehicle according to claim 7, further comprising a heat sink provided in an external surface of the casing.

* * * * *